US006286639B1

United States Patent
Uhlig

(10) Patent No.: US 6,286,639 B1
(45) Date of Patent: Sep. 11, 2001

(54) SERRATED TUNED BRAKE DRUM

(75) Inventor: Robert P. Uhlig, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/410,296

(22) Filed: Sep. 30, 1999

(51) Int. Cl.[7] .................................................. F16D 65/10
(52) U.S. Cl. .................................. 188/218 R; 188/264 A
(58) Field of Search ...................... 188/218 R, 74, 188/75, 76, 264 A, 264 AA, 264 R

(56) References Cited

U.S. PATENT DOCUMENTS

| | | | |
|---|---|---|---|
| 1,990,746 | * | 2/1935 | Nelson ............................. 188/218 R |
| 2,288,438 | | 6/1942 | Dach . |
| 3,016,269 | * | 1/1962 | De Lorean ....................... 188/218 R |
| 3,043,631 | * | 7/1962 | Swoboda .......................... 188/218 R |
| 3,113,647 | * | 12/1963 | Tuttle ............................... 188/218 R |
| 5,383,537 | | 1/1995 | White . |
| 5,538,113 | | 7/1996 | White et al. . |
| 5,823,304 | | 10/1998 | Wagg . |
| 5,826,684 | | 10/1998 | Hester . |
| 5,957,249 | * | 9/1999 | Yamazaki et al. ............... 188/218 R |

FOREIGN PATENT DOCUMENTS

| | | |
|---|---|---|
| 5652633 | 5/1981 | (JP) . |
| 57208329 | 12/1982 | (JP) . |
| 5850332 | 3/1983 | (JP) . |

* cited by examiner

Primary Examiner—Robert J. Oberleitner
Assistant Examiner—Robert A. Siconolfi
(74) Attorney, Agent, or Firm—Mark P. Calcaterra

(57) ABSTRACT

A brake drum has an axially extending cylindrical flange formed with a radially outer surface and a radially inner braking surface. To reduce, if not entirely eliminate brake drum howling and squealing when the brakes are applied, a plurality of stabilizing sections are cast on the radially outer surface of the flange. The stabilizing sections are arranged in equally circumferentially spaced apart relation. Each stabilizing section is slotted or notched to form a plurality of circumferentially spaced serrations to increase flexibility.

2 Claims, 2 Drawing Sheets

SERRATED TUNED BRAKE DRUM

This invention relates generally to brake drums and more particularly to a brake drum so constructed as to substantially reduce, if not entirely eliminate, brake drum noise.

BACKGROUND OF THE INVENTION

A symmetrically round object such as a brake drum has two similar primary vibrational modes displaced 45° away from one another. If the difference in frequency of vibration between these two modes is very small, a brake drum will be more likely to howl or squeal when the brakes are applied. It has been discovered that this problem, sometimes referred to as an instability problem, can be alleviated if the difference in frequency of these two modes can be increased to over about 50 Hertz (Hz). Hz is a measure of vibration frequency in cycles per second.

It has been proposed to solve this instability problem by adding symmetrically placed stabilizing sections around the periphery of the brake drum. The stabilizing sections add mass but also increase stiffness considerably. If four stabilizing sections are oriented at 90° intervals, they will affect one of the two similar primary modes of vibration much more than the other and thus separate the vibration frequency of one mode relative to the other sufficiently to solve the instability problem. However, the stabilizing sections, while solving the instability problem, cause another problem and that is, as the brake shoes expand to apply the brakes, the weaker sections of the drum between the stabilizing sections deflect more than the stabilizing sections, distorting the brake drum. Accordingly, the frictional force at the stabilizing sections will be higher than that between the stabilizing sections, producing a variation in brake torque four times per revolution. Also, where the frictional force is higher, there is local heating (hot spots) which distorts the drum even more. This produces roughness and noise, both of which are objectionable.

What is needed is a brake drum construction which deals with the noise instability problem without causing distortion of the brake drum.

SUMMARY OF THE INVENTION

In accordance with the present invention, the stabilizing sections are serrated, that is notched or slotted, so that while mass is significantly increased, stiffness is increased only slightly. Therefore when the brakes are applied by expansion of the brake shoes, the load is applied in a more uniform manner creating less torque variation and less local heating. Also, the increased surface area produced by the serrations improves heat dissipation and hence there is less thermal distortion. An increase in mass lowers natural frequency while an increase in stiffness raises it. Thus the increased mass of the stabilizing sections will lower the frequency of one of the two similar primary modes of vibration more effectively since the serrations provide less increase in stiffness for a given mass, but will still separate the vibration frequencies of the modes in question sufficiently to solve the noise instability problem.

One object of this invention is to provide a brake drum having the foregoing features and capabilities.

Another object is to provide a brake drum which is of simple construction, is rugged and durable in use and highly effective in the performance of its intended function.

These and other objects, features and advantages of the invention will become more apparent as the following description proceeds, especially when considered with the accompanying drawings.

DETAILED DESCRIPTION OF THE PREFERRED EMBODIMENT

Figure 1:
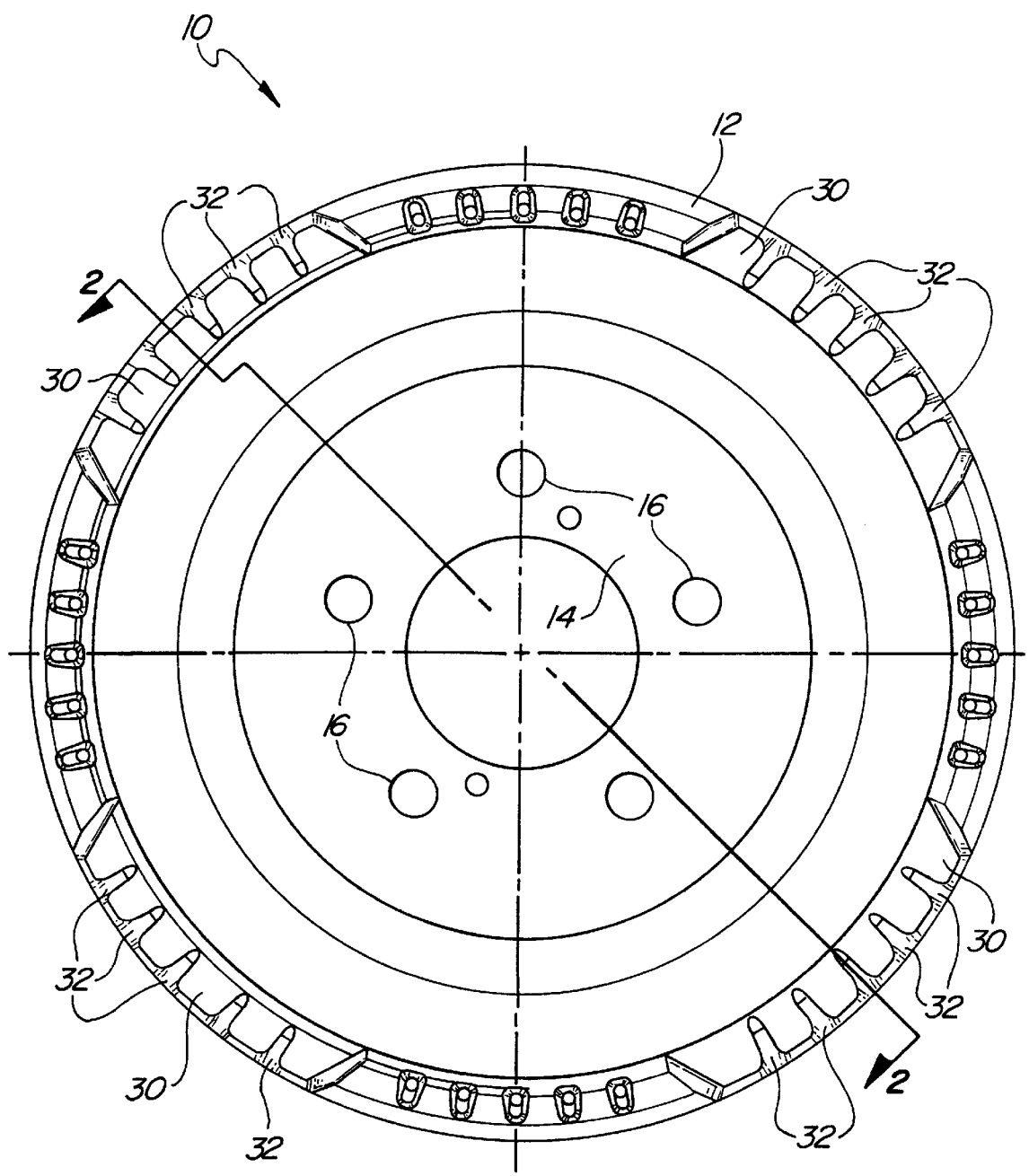
FIG. 1 an elevational view of a brake drum constructed in accordance with the invention.

Referring now more particularly to the drawings, a brake drum 10 is shown having a cylindrical brake flange 12 open at the front and closed at the back by a backing plate 14, which extends radially inwardly from the rear edge of the flange 12. The brake drum is preferably made of cast iron and is adapted to be secured to a wheel of a motor vehicle by fasteners inserted through holes 16 in the backing plate. Brake shoes 18, diagrammatically shown in FIG. 2, are adapted to be moved radially outwardly to engage the radially inner braking surface 20 of the brake flange 12 when the brakes are applied to retard rotation of the brake drum and the wheel to which the brake drum is secured.

Figure 3:
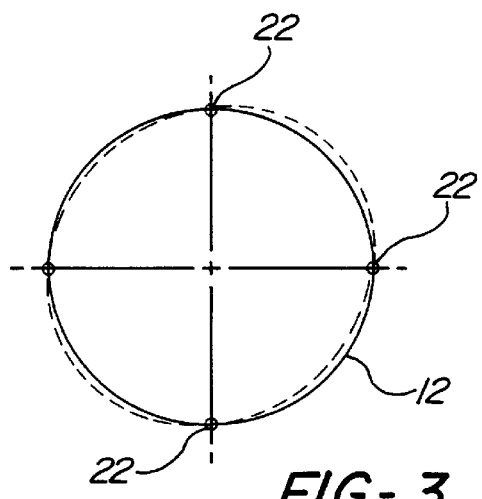
FIGS. 3 and 4 are diagrammatic views showing two similar modes of vibration, at 45° from each other.
Figure 4:
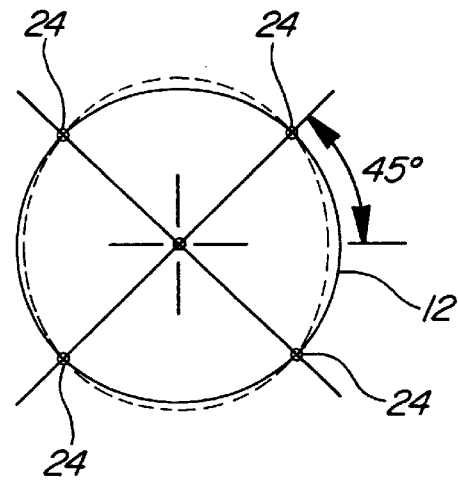

As previously stated, a cylindrical brake drum may produce a howling noise under some conditions. This howling noise may be in the 700 Hz range and this has been associated with the second nodal diameter mode of the drum. FIGS. 3 and 4 diagrammatically illustrate the cylindrical flange 12 of the brake drum at the two similar primary vibrational modes shown 45° from one another. The nodes are represented by the dots 22 in FIG. 3 and dots 24 in FIG. 4 and the vibratory effect is illustrated in broken lines.

Due to discontinuities in casting, there is a small (about 2 Hz) difference in frequency between these modes. Stabilizing sections 30 are added to the brake drum 10 to increase the difference in frequency to over 50 Hz and thereby solve the noise (instability) problem.

Figure 2:
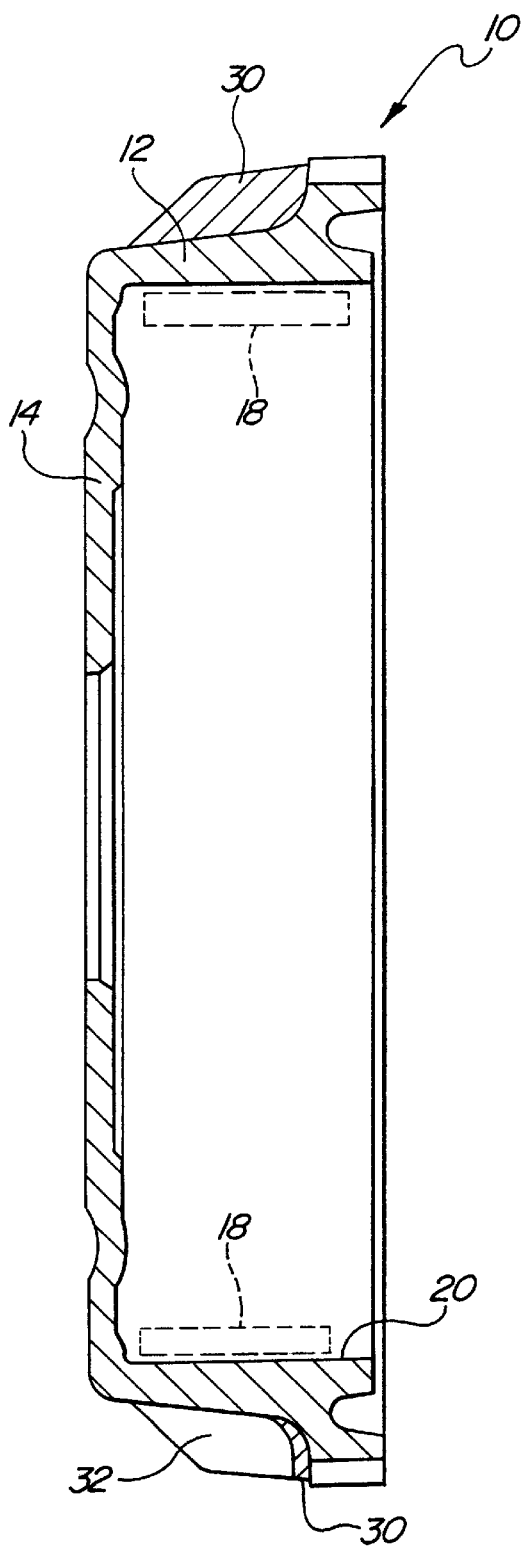
FIG. 2 is a sectional view taken on the line 2—2 in FIG. 1.

As shown in FIGS. 1 and 2, four stabilizing sections 30 are secured to the brake drum at equally spaced 90° intervals. Each stabilizing section 30 is formed integrally and of one piece with the flange 12 on the radially outer surface thereof. Each stabilizing section 30 is elongated and arcuate to match the curvature of the flange 12, and slotted or notched to provide a plurality of serrations 32 which are circumferentially spaced apart equal distances, along the arcuate length of the stabilizing section. Preferably the stabilizing sections are cast on the flange 12 during casting of the brake drum.

The stabilizing sections 30 add enough mass to the brake drum to solve the noise (instability) problem, but, being serrated, stiffness is increased only slightly. Therefore, distortion of the brake drum is minimized during a braking application. Braking will be more uniform with less torque variation and hence less local heating. The serrations do not cut entirely through the stabilizing sections so that each stabilizing section remains a single discrete mass but with more flexibility and less stiffness. The serrations also provide additional surface area to improve the ability of the brake drum to dissipate heat.

What is claimed is:

1. A brake drum comprising:

a generally axially extending cylindrical flange having a radially inner braking surface adapted to be engaged by brake shoes in a braking operation and also having a radially outer surface, means for adding mass to the brake drum to suppress noise comprising a plurality of stabilizing sections on the radially outer surface of said flange, said stabilizing sections being secured to and arranged in equally circumferentially spaced apart relation about said radially outer surface and each being of predetermined circumferential extent, said sections are circumferentially spaced apart by a distance greater than zero, and a plurality of circumferentially spaced slots in each of said sections to decrease the stiffness and increase the flexibility of said sections, wherein there are four, and only four, of said sections at 90° intervals around the radially outer surface of said flange, said sections being formed integrally with said flange.

2. A brake drum as defined in claim 1, wherein said brake drum and said stabilizing sections are made of cast iron and the slots in each of said stabilizing sections are equally spaced apart and are in the form of radially outwardly opening serrations.

* * * * *